United States Patent [19]

Schoonmaker et al.

[11] Patent Number: 4,477,473
[45] Date of Patent: Oct. 16, 1984

[54] APPARATUS AND METHOD FOR PRODUCING FROZEN CONFECTIONS

[75] Inventors: C. Donald Schoonmaker, Boonton; Jonas Bortkevicius, No. Brunswick, both of N.J.

[73] Assignee: General Foods Corporation, White Plains, N.Y.

[21] Appl. No.: 457,326

[22] Filed: Jan. 12, 1983

[51] Int. Cl.³ .................. G01N 33/02; A23P 1/00; B67D 5/16
[52] U.S. Cl. .................................. 426/231; 222/71; 425/145; 425/449; 426/515; 426/524
[58] Field of Search ............... 426/515, 524, 565, 134, 426/231; 425/261, 547, 588, 449, 145, 376 B; 418/207; 222/55, 71; 137/8; 62/380, 345

[56] References Cited

U.S. PATENT DOCUMENTS 3,543,784 12/1970 Smith ........................................ 137/8
3,763,661 10/1973 Betschart et al. ....................... 62/380
4,111,272 9/1978 Ricciardi et al. ....................... 222/71

Primary Examiner—George Yeung
Attorney, Agent, or Firm—Thomas R. Savoie; Daniel J. Donovan; Joseph T. Harcarik

[57] ABSTRACT

An apparatus and a method for the production of frozen confections wherein the frozen confections are produced from a supply of a generally semifrozen confection material of viscous consistency conveyed at a constant volume and at a constant rate through a novel filling system into a plurality of molds. The apparatus provides for the production of frozen confections from a supply of a generally semi-frozen, compressible material having a highly viscous consistency, wherein the material is rapidly and accurately metered into "bottom-up" molds which are indexed into position below a filling station, and in which filling nozzles are inserted into the molds so as to fill the latter with the material to the desired extent as the nozzles are raised upwardly out of the molds. Moreover, the invention contemplates the provision of novel metering pump means wherein metered quantities of the confection material are continuously supplied to the filler nozzles, and in which pump structure connected upstream of the metering pump will continuously supply the confection material in a predetermined pressurized condition to the metering pump in order to preclude the formation of any voids in the material being introduced into the molds, thereby presenting an extremely accurate apparatus and method in being able to precisely meter the required amounts of confection material into the molds without the creation of voids or the possibility of incomplete filling of the molds causing wastage which would result in a lower efficiency in production and economy for the apparatus and method.

18 Claims, 14 Drawing Figures

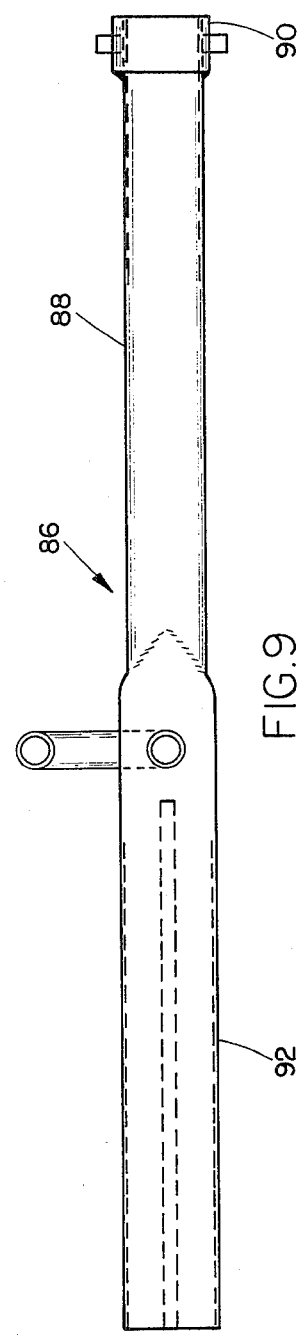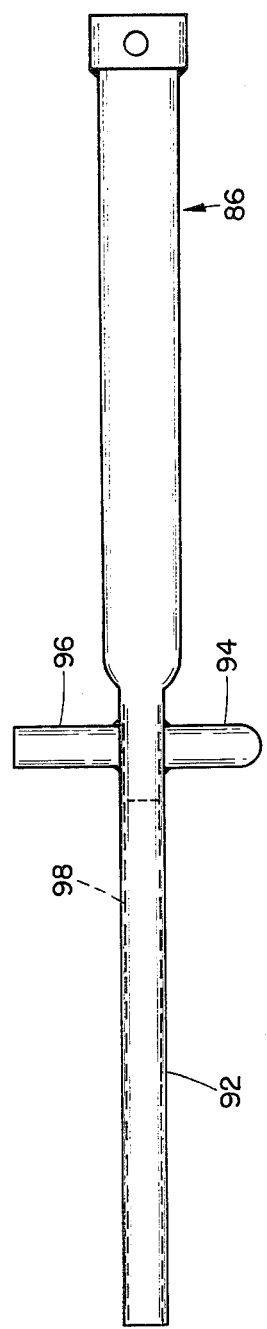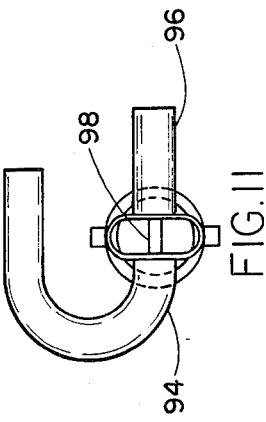

APPARATUS AND METHOD FOR PRODUCING FROZEN CONFECTIONS

1. Field of the Invention

The present invention relates to an apparatus and to a method for the production of frozen confections and, more particularly, relates to an apparatus and a method wherein the frozen confections are produced from a supply of a generally semi-frozen confection material of a compressible and viscous nature which is dispensed at a constant volume and at a constant rate from a novel filling system into a plurality of molds.

In the technology relating to the production of quiescently frozen confections, for example, such as fruit flavored pops having sticks projecting therefrom, such as the products marketed under the trademark Popsicles, numerous apparatuses and methods have been developed through the utilization of which such frozen confections can be produced at reasonably economical production rates. Generally, apparatuses which are employed for this purpose provide for a large number of molds which are conveyed past a filling system in an inverted (i.e. closed bottom and open top) position, and with a filler nozzle for the confection material being adapted to dispense a predetermined or metered quantity of the material into the mold. The filled molds are then conveyed through a cooling bath wherein, at some predetermined location, suitable sticks may be inserted into the almost frozen confection, and, thereafter, the confection is completely frozen, removed from the mold and packaged.

2. Discussion of the Prior Art

Among various apparatuses which are designed to assist in the development of this technology is Harper et al. U.S. Pat. No. 4,323,336 which discloses a machine for inserting sticks into frozen confections wherein the frozen confection has been previously filled into molds.

Similarly Betschart et al. U.S. Pat. No. 3,763,661 discloses an apparatus for forming frozen confections wherein a plurality of molds are conveyed beneath a filling arrangement and adapted to have the confection material filled into the molds in a sequential order.

A similar method and machine is disclosed in Lampman U.S. Pat. No. 3,335,579 wherein a continuous conveyor system supports a plurality of molds which are filled in the inverted position, and wherein sticks may than be inserted into the partially-frozen material contained in the molds.

Furthermore, Betschart U.S. Pat. No. 3,771,322 discloses an apparatus for the filling of molds wherein a plurality of manifolds may be employed for supplying confections of different flavors to various rows of inverted molds.

Other apparatuses and methods for providing for the filling of inverted molds with product which is to be frozen into suitable blocks or slabs and which may have sticks inserted therein can be found in Hirahara et al. U.S. Pat. Nos. 3,403,639 and 3,488,976 in which a mold filler nozzle arrangement continuously fills molds which are passed therebeneath while supported on an endless conveyor system with a confection material of a fluid consistency, with the filled molds then being conducted through a tank for effecting the freezing of the material in the molds, and wherein the frozen material is then removed from the molds and suitably wrapped while the emptied molds are washed and returned to the filling arrangement.

Additional conveyor and filler systems for producing frozen confections are disclosed in Cross et al. U.S. Pat. No. 4,253,560 and Tumey et al. U.S. Pat. No. 4,209,288, wherein the molds are adapted to be filled with gelatinous confection material through suitable filling devices and in which the molds, and product which has been frozen therein, are conveyed through suitable processing cycles for removal of the frozen product from the molds and effectuating the subsequent wrapping of the frozen confection product.

Basically, although many of these machines and methods provide suitable arrangements and systems for the rapid filling of large numbers of molds with confectionary products which are to be frozen and subsequently wrapped and packaged after removal from the molds, quite frequently the flowable confection material which has previously been brought into at least a semi-frozen and gelatinous consistency in a suitable supply reservoir will not readily flow or dispense in a sufficiently precisely metered measure due to the high viscosity of the material. Further, the prior art machines known to the inventors herein are not capable of dispensing uniform volumes of a compressible fluid especially at high line speeds (e.g. above 25 cycles per minute).

Commercial operation is further complicated by the fact that continuous freezers and aerators are desirably employed to feed a compressible (i.e. aerated) semi-frozen fluid to the filling system. The actual filling takes place, however, in a semicontinuous or intermittent manner. Further, the viscosity of the fluid can vary significantly with minor changes in temperature and the density of the fluid will vary with changes in aeration due to either operating or ingredient variations. It is of importance that the material be dispensed into the molds at a constant volumetric flow rate thereby ensuring the presence of precisely filled molds at all times during the operation of the frozen confection producing apparatuses.

Although different types of metering valves and pumps have been developed for conducting incompressible flowable materials through various devices and also for filling molds, these have not found ready utilization in connection with processes directed to the uniform and constant conveyance of compressible materials, such as those constituted essentially of aerated semi-frozen, highly viscous confection materials, having essentially an ice cream-like or gelatinous consistency.

Ricciardi et al. U.S. Pat. No. 4,111,272 discloses a weigh feeding apparatus wherein material is metered from a refill source through a refill controller into a discharge hopper through the generation of electronic signals for controlling the rate of the discharge, and in which the signal is generated in proportion to the weight of the discharge material and to allow for corrective action to be taken in response to the weight deviating from a predetermined value. Although the relatively complex arrangement disclosed in this patent would provide for accurate weight measurement of any product which is being dispensed, it does not appear to be practically applicable to the conveyance and feed of compressible materials in a semi-frozen condition, and which is of a viscous, gelatinous or cream-like consistency.

Moule U.S. Pat. No. 3,889,013 discloses a method for making skinless food products, wherein liquefied material is conveyed, admixed with other materials and then transported at a predetermined rate through various conduits toward a discharge orifice. As in Ricciardi et al., the apparatus is not adapted for the conveyance and metered dispensing of compressible confection materials having an ice cream-like or gelatinous consistency and in which the material is in a semi-frozen, high viscosity state.

Smith U.S. Pat. No. 3,543,784 discloses a flow control system wherein a plurality of flow controllers regulate a valve downstream of a pump in order to provide for metered amounts of material flow. In this instance the flow control is primarily for a smoothly flowing fluid and is not adapted to provide for the metered dispensing of an compressible semi-frozen material having an ice cream-like or gelatinous consistency without the formation of voids in the fed material which conceivably could lead to the uneven and possibly interrupted filling of a plurality of molds for frozen confections.

Other filling systems and metering for various types of fluids or the like are disclosed in Becket et al. U.S. Pat. No. 4,141,287; Anderson et al. U.S. Pat. No. 2,877,121; Bernard U.S. Pats. No. 4,124,339 and 4,060,998; Holgcker U.S. Pat. No. 2,876,111; and Billett et al. U.S. Pat. Nos. 3,30,245 and 4,324,108. However, none of these prior art patents are adapted for the consistent metered feeding of an compressible viscous liquid material having an ice cream-like or gelatinous consistency, and wherein the compressible material is in a semi-frozen state when supplied to a mold filling system in a continuous manner from a suitable supply reservoir.

SUMMARY OF THE INVENTION

Although this invention is described in terms of the production of frozen confections, it will be apparent that the invention is suitable for any instance where a repeated delivery of a predetermined constant volume of a compressible, viscous fluid at a constant rate is desired. The scope of this invention is therefore not limited to the production of frozen confections.

The present invention provides for an apparatus and for a method of dispensing a compressible, (e.g. aerated) viscous, flowable confection material having an ice cream-like or gelatinous consistency and which is in a semi-frozen state, into a plurality of inverted molds for the formation of frozen confections, wherein the confection material is filled into the molds at a constant volume and feed rate through the interposition of novel filling nozzles and metering pump devices which will preclude the formation of voids in the dispensed material by ensuring the repeated and uninterrupted supply of metered quantities of the confection material to the nozzles and molds from the metering pump devices.

In connection with the foregoing, the inventive apparatus enables the production of frozen confections from a supply of a generally semi-frozen, compressible material having a highly viscous consistency, wherein the material is rapidly and accurately metered into a series of inverted molds which are sequentially indexed into position below a filling station, and in which filling nozzles are inserted into the molds so as to fill the latter with the material to the desired extent as the nozzles are raised upwardly out of the molds. Moreover, the invention contemplates the provision of novel metering pump means wherein constant matered volumes of the confection material are repeatedly supplied to the filler nozzles. According to this invention a positive-displacement metering pump device communicates with an upstream pump means which will continuously feed the compressible, flowable confection material to the metering pump device. The metering pump device is actuated in response to a pressure sensing means and is driven by means of a timed motor, such that at a predetermined positive pressure created by the flowable confection material, the metering device will operate for a predetermined and set period of time thereby supplying a constant volume of confection material downstream. The material dispersed from the metering device will be free of voids and of constant volume. This invention presents an extremely accurate apparatus and method for precisely metering the required amounts of compressible confection material into the molds at speeds in excess of 25 cycles per minute without the creation of voids or the possibility of non-uniform filling of the molds.

According to this invention the metering device is in the form of a rotary valve and is designed with sufficiently close tolerances such that when it is not in operation it will serve as a seal between the pressure head created by the upstream material and downstream material which is essentially at atmospheric pressures. In this manner no leakage is permitted. When the metering device is set in operation it will take in and dispense constant volumes of material in the manner of a volumetric, positive displacement lobe pump. A piston device would not be able to take in and dispense constant volumes of a compressible material at a reasonable rate.

Pursuant to another feature of the invention, the filling nozzles, which are reciprocated downwardly into and then raised out of the molds during the filling sequence may be provided with secondary infeed sources for incorporating an additional confection material, such as a colored and/or flavored syrup, to the basic confection material being advanced through the nozzles in order to create an admixture of materials forming attractive decorative coloring patterns and/or imparting multiple flavors to the finished frozen confection.

In a specific design of the filling nozzle construction, the additional confection material may be introduced, concurrent with the filling of the molds with the basic confection material, in a generally helical or swirl pattern by a rotating tube within the nozzles so as to enhance the asthetic appearance of the finished confection product to a consumer.

Accordingly, it is a primary object of the present invention to provide an apparatus for the improved and more precise filling of molds employed for a frozen confection through the utilization of an inverted mold filling arrangement.

A more specific object of the present invention is to provide a novel metering pump arrangement which will ensure that a constant metered flow of a semi-frozen confection material is supplied to filling nozzles employed in the filling of the molds in order to ensure the uniform filling of the molds while concurrently precluding the formation of voids in the material.

Still another object of the present invention is to provide a novel filling nozzle construction for the inventive apparatus wherein the nozzles are adapted to provide for the admixing of two different types of confection materials in order to provide a frozen confection of enhanced asthetic appearance and multiple flavors.

Yet another object of the present invention is to provide a method for producing a frozen confection utilizing the apparatus as set forth herein.

BRIEF DESCRIPTION OF THE DRAWINGS

Reference may now be had to the following detailed description of exemplary embodiments of an apparatus for forming a frozen confection pursuant to the invention, taken in conjunction with the accompanying drawings; in which:

FIGS. 9 and 10 illustrate, respectively, longitudinal views of a modified embodiment of the filling nozzle for the mixing of two materials;

FIG. 11 illustrates an end view of the nozzle of FIGS. 9 and 10 viewed from the dispensing end thereof;

Referring to FIG. 1 of the drawings, there is diagrammatically illustrated an apparatus 10 for producing frozen confections FC which, in this instance, may consist of blocks having a so-called "frozen" configuration with a suitable projecting gripping stick embedded therein, as is well known in the art and in commerce. The apparatus 10 generally includes an endless conveyor system 12 which is transported in the direction of arrows A. Carried by the conveyor system 12 are a large number of molds 14 which have an internal configuration in conformance with the frozen confection which is to be produced by the apparatus. The molds 14 may be spaced not only along the length of the conveyor system 12, but a plurality of molds may be positioned in a side-by-side relationship extending across the width of the apparatus so as to provide for a number of production lines.

Figure 1:
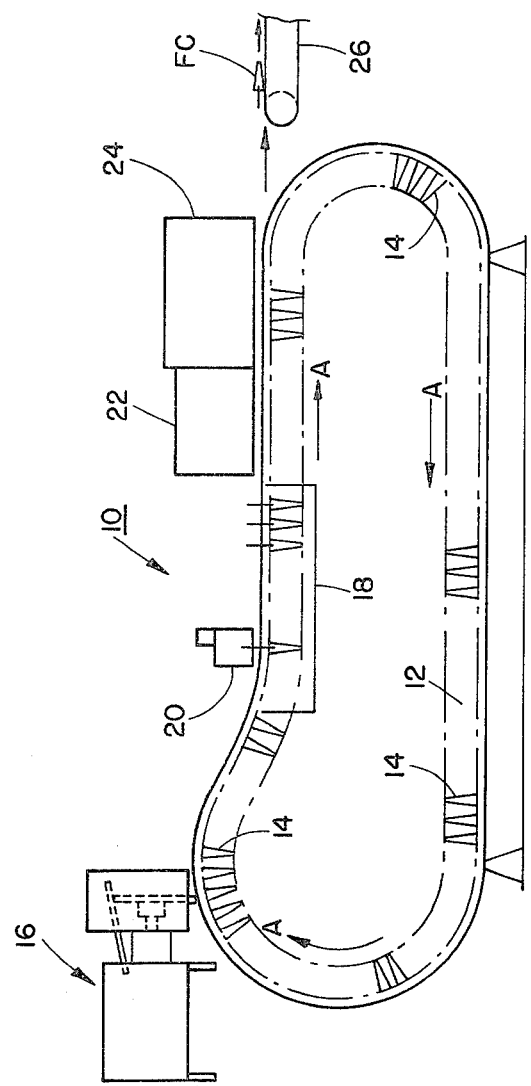
FIG. 1 illustrates a generally diagrammatic representation of an apparatus for producing frozen confections pursuant to the invention.

Arranged above the upper run of the conveyor system 12, as shown towards the left end of the apparatus 10, is a mold filling arrangement 16 pursuant to the invention, and which is adapted to fill the molds 14 positioned below the filling station with a suitable confection material, in this instance, a semi-frozen, compressible, flowable material having a high viscosity. The confection material is pumped from a suitable supply source or reservoir (not shown), such as a continuous freezer or refrigeration installation, in which the material is maintained in a generally semi-frozen condition adapted to be pumped towards the filling arrangement 16.

The molds 14, subsequent to being filled with the confection material by the filling arrangement 16, are conveyed into a freezing zone 18 containing a suitable freezing liquid or brine for freezing the confection material within the molds 14 into a solidified frozen condition. Prior to the confection material being completely frozen, suitable sticks may be partially immersed into the material contained in the molds 14 through the intermediary of a stick inserting mechanism 20, as is well known in the art. From that location molds 14 containing the frozen material is conducted to a treatment station 22 which will facilitate the removal of the frozen confection from the molds 14, while providing for the coating of the confection, such as with a thin layer of ice, and from there transported to a wrapping station 24 for individually enveloping each of the frozen confections FC with a suitable overwrap. From there the frozen confections may be conducted onto a suitable conveyor arrangement 26 for further packaging and shipping, while the empty molds 14 are conducted by the lower run of the conveyor system 12, after passing through a washing installation (not shown), back to the filling arrangement 16.

Figure 2:
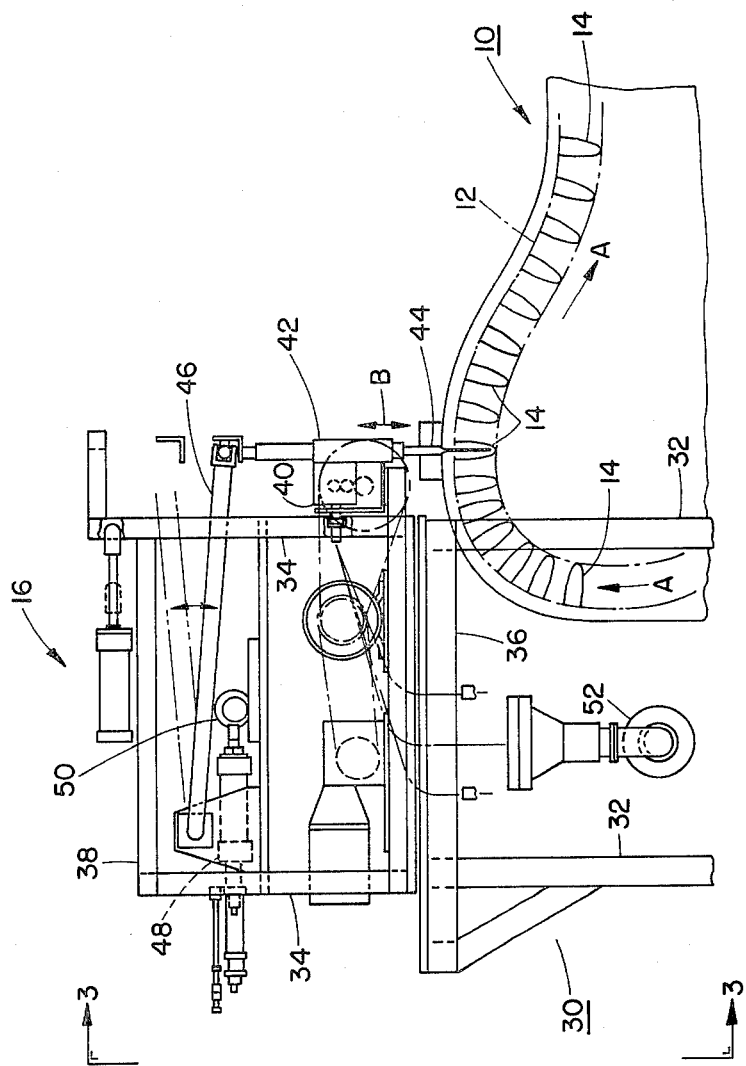
FIG. 2 illustrates a generally diagrammatic representation of the filling portion of the apparatus of FIG. 1, shown in a side elevational view.
Figure 3:
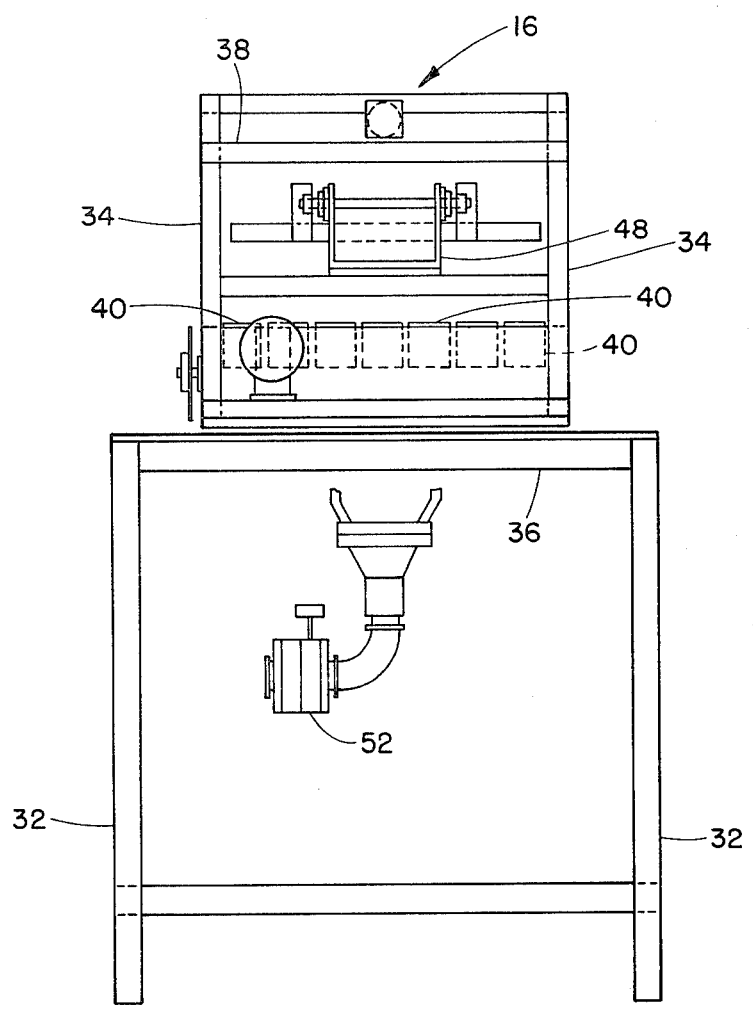
FIG. 3 is an end view of the apparatus taken in the direction of line 3—3 in FIG. 2.

Referring in greater particularity to the filling arrangement 16, as shown in FIGS. 2 and 3 of the drawings, the arrangement includes a stationary frame 30 which may include uprights 32 and 34, and horizontal frame components 36 and 38. The frame structure 30 supports a metering pump unit 40 having a filler nozzle unit 42 operatively connected thereto. The filler nozzle unit 42 includes vertically displaceable dispensing nozzles 44 adapted to be reciprocated into and out of the molds 14 along the direction of arrow B.

The vertical reciprocation is imparted to the dispensing nozzle 44 in that a pivotable actuating arm 46 is articulated at one end thereof to the upper end of the dispensing nozzles, with the other end of the arm being fastened to an actuating unit 48, which may be hydraulically or pneumatically operated, and wherein reciprocation of the actuating element of unit 48 may operate a cam 50 which, in turn, causes the actuating arm 46 to pivot either upwardly or downwardly. A supply of the semi-frozen confection material is continuously pumped through the manifold 52 from a suitable reservoir or supply source (not shown) into the metering pump 40.

Figure 4:
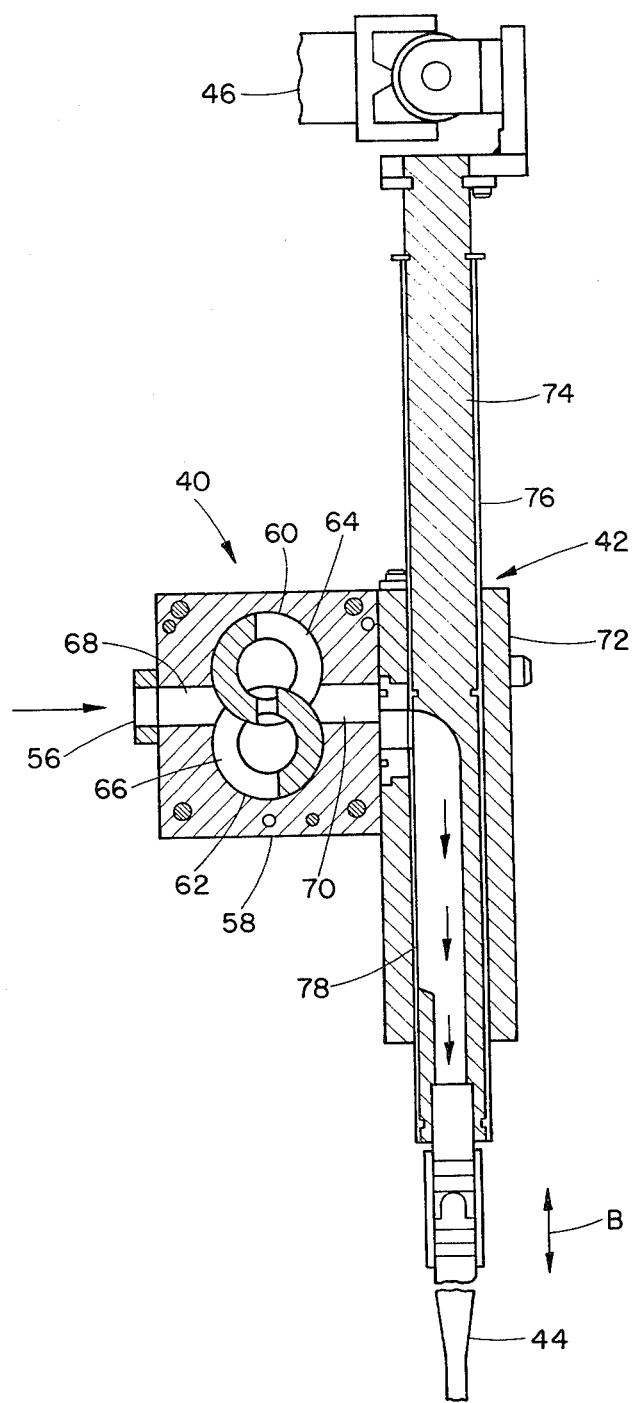
FIG. 4 is a longitudinal sectional view through a first embodiment of a filling nozzle and metering device arrangement for the apparatus of FIG. 1.
Figure 5:
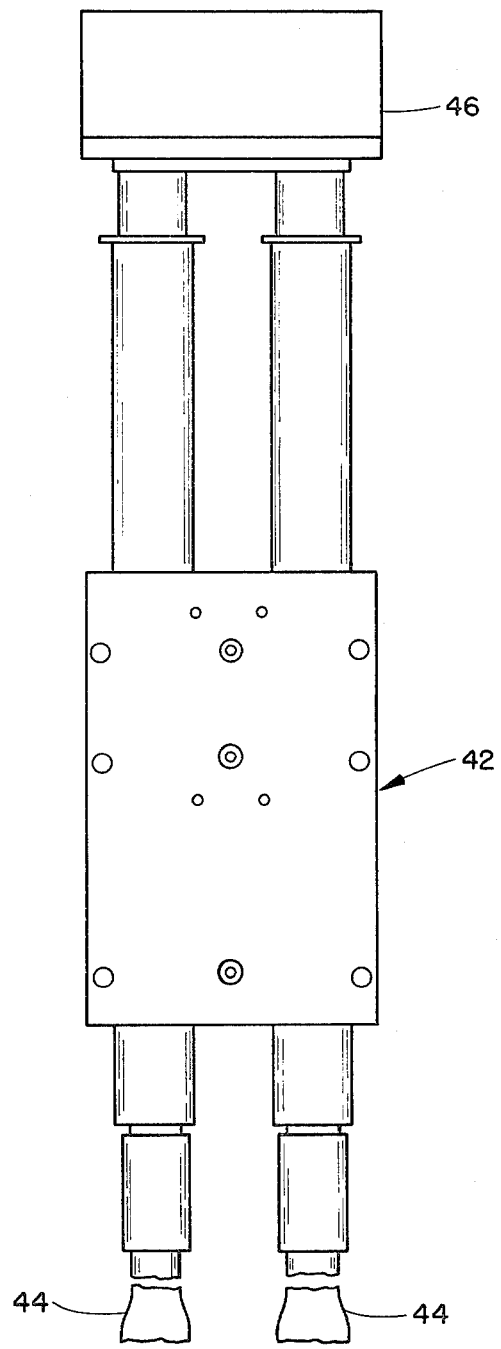
FIG. 5 is an end view of the nozzle arrangement of FIG. 4.

Referring in detail to the metering pump 40 and the filling nozzle unit 42, illustrated in FIGS. 4 and 5 of the drawings, as mentioned, the metering pump 40 receives a continuous supply of the pressurized confection material from the manifold 52 through pump inlet 56. The metering pump 40 consists of a housing 58 which may be designed to supply two filling nozzles units 42, as shown in FIG. 5, by having two separate sets of annular valve chambers arranged in side-by side or tandem relationship. For purposes of clarity only one set of valve chambers is described herein for supplying a single dispensing nozzle 44 with confection material. Arranged in the lobe chambers in the housing 58 of the metering pump 40 are, respectively, two rotatable arcuate lobe members 60 and 62 which communicate with each other and contact through intersecting annular passageways 64 and 66 and with passageway 68 leading from the inlet 56. The passageways 64 and 66 are dimensioned whereby, for each period of rotation of the respective lobe members 60 and 62, there is advanced, via positive displacement, a metered amount of confection material into the filling nozzle unit 42. Again as noted previously, the rotation of the lobes will be driven by a timed motor and will commence in response to the sensing of a predetermined pressure in passageway 68 and the rotation will cease after a predetermined period of time has elapsed. As will be apparent, the time period during which the motor operates will directly control the amount of material dispensed. As the material in passageway 64 is advanced into outlet passageway 70, a similar amount of material is introduced into the passageway 66 through passageway 68 from the material supply or reservoir through the manifold 52. Once rotation of the lobe members ceases, flow or leakage through the metering device is stopped by the interaction of the lobe members and the passageways. Thus a consistent supply of material which is free of any voids is fed to outlet passageway 70 leading to the filling nozzle unit 42. As illustrated, each filling nozzle unit 42 may consist of a pair of nozzles 44 positioned side-by-side or in tandem, and with one metering pump 40 attached thereto having a pair of passageways on both sides thereof adapted to have the lobe members rotated through the intermediary of a suitable actuating drive unit positioned on the frame 30.

Figure 6:
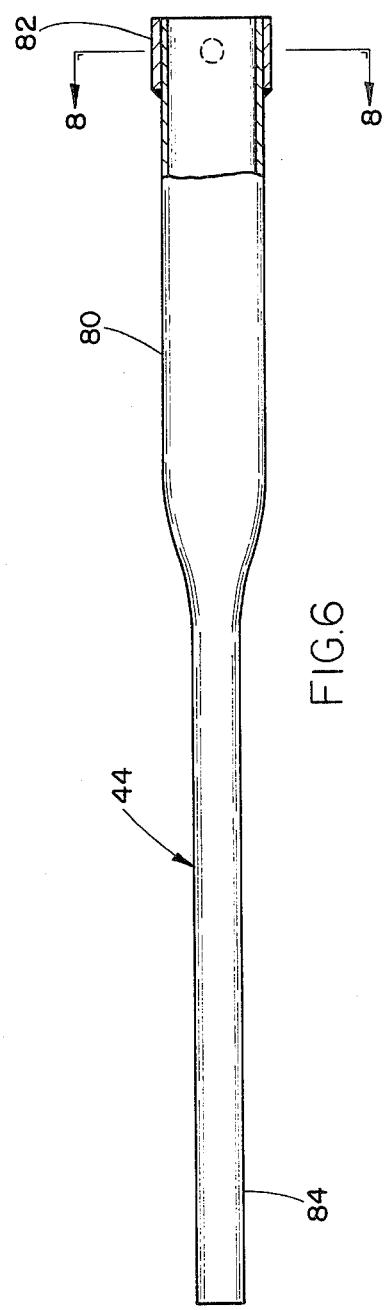
FIG. 6 illustrates a detail of the dispensing nozzle of FIG. 4, shown partly in section.
Figure 7:
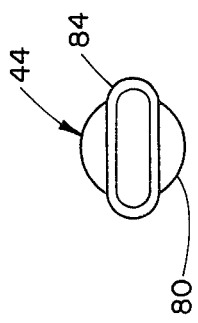
FIG. 7 is an end view of the dispensing end of the nozzle of FIG. 6.
Figure 8:
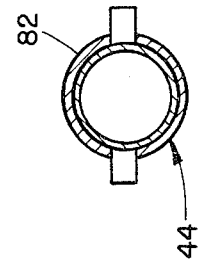
FIG. 8 illustrates a sectional view taken along line 8-8 in FIG. 6.

The filling valve unit 42, in this instance consisting of two filling nozzles 44, includes a housing 72 suitably fastened to the metering pump 40, and has a nozzle stem section 74 slidably arranged in a stationary guide 76. The stem section 74 includes an elongated longitudinal slot 78 facing towards the outlet passageway 70 of the metering pump 40, and is always in communication therewith so as to allow for the continual flow of confection material therethrough, with the nozzle and passageway 70 normally being completely filled with material. Locked into the bottom end of the stem portion 74, for example, through a bayonet lock, is the actual filling nozzle 44, as is more closely described in connection with FIGS. 6 through 8, and which is adapted to be vertically reciprocated into and out of a mold 14 in the direction of arrow B.

The dispensing nozzle 44 consists of a hollow tubular portion 80 of generally cylindrical cross-sectional configuration having an annular flange 82 at one end incorporating a bayonet lock for engaging the lower end of the stem 74. The lower end of the nozzle 44 is formed generally flattened slot-like cross-sectional configuration 84 so as to be readily enabled to move into a mold 14 positioned therebelow at the filling location of the apparatus 10. Thus, at the downstroke of the dispensing nozzle unit 42 into a mold 14 which is to be filled with confection material contained in the dispensing nozzle unit and metering pump, the lower end of the section 84 almost contacts the mold bottom interiorly of an associated mold 14 which is positioned therebelow. During the upward movement of the filling nozzle 44, there is concurrently effected rotation of the lobe members 60 and 62 for a set time cycle so as to cause a requisite amount of confection material to be advanced through passageway 70 and the slot 78 interiorly of the dispensing nozzle and out through the discharge orifice at the lower end of the nozzle portion 84 into the mold 14. As the nozzle is raised out of the mold 14 a sufficient amount of confection material will have been discharged from the lower end of the nozzle to fill the mold 14, while, concurrently, the lobe members 60 and 62 are beeing rotated in the metering pump 40.

When it is desired to form a composite frozen confection, by incorporating a flow of a second confection material, such as a colored and/or flavored syrup which is admixed with coated on the base confection material, in lieu of the filling nozzle 44 there may be employed a filling nozzle 86 having a construction as is disclosed in FIGS. 9 through 11 of the drawings. In this instance, the filling nozzle 86 which also includes a cylindrical portion 88 and a bayonet-type locking flange or collar 90 at one end, is provided with a flattened lower discharge section 92, similar to the construction of filling nozzle 44. However, in this instance, along the wall of the flattened nozzle portion 92 there are provided inlet connections 94 and 96 for conduits or tubes which communicate with a supply source (not shown) for the syrup adapted to be applied in a pattern on the base confection material which is advanced downwardly through the nozzle 86. In order to ensure that the syrup will not completely dispense into or blend with the confection material, a longitudinally extending baffle plate 98 may be provided centrally of the passageway in the lower conduit portion 92 of the nozzle 86.

Figures 12, 13, 14:
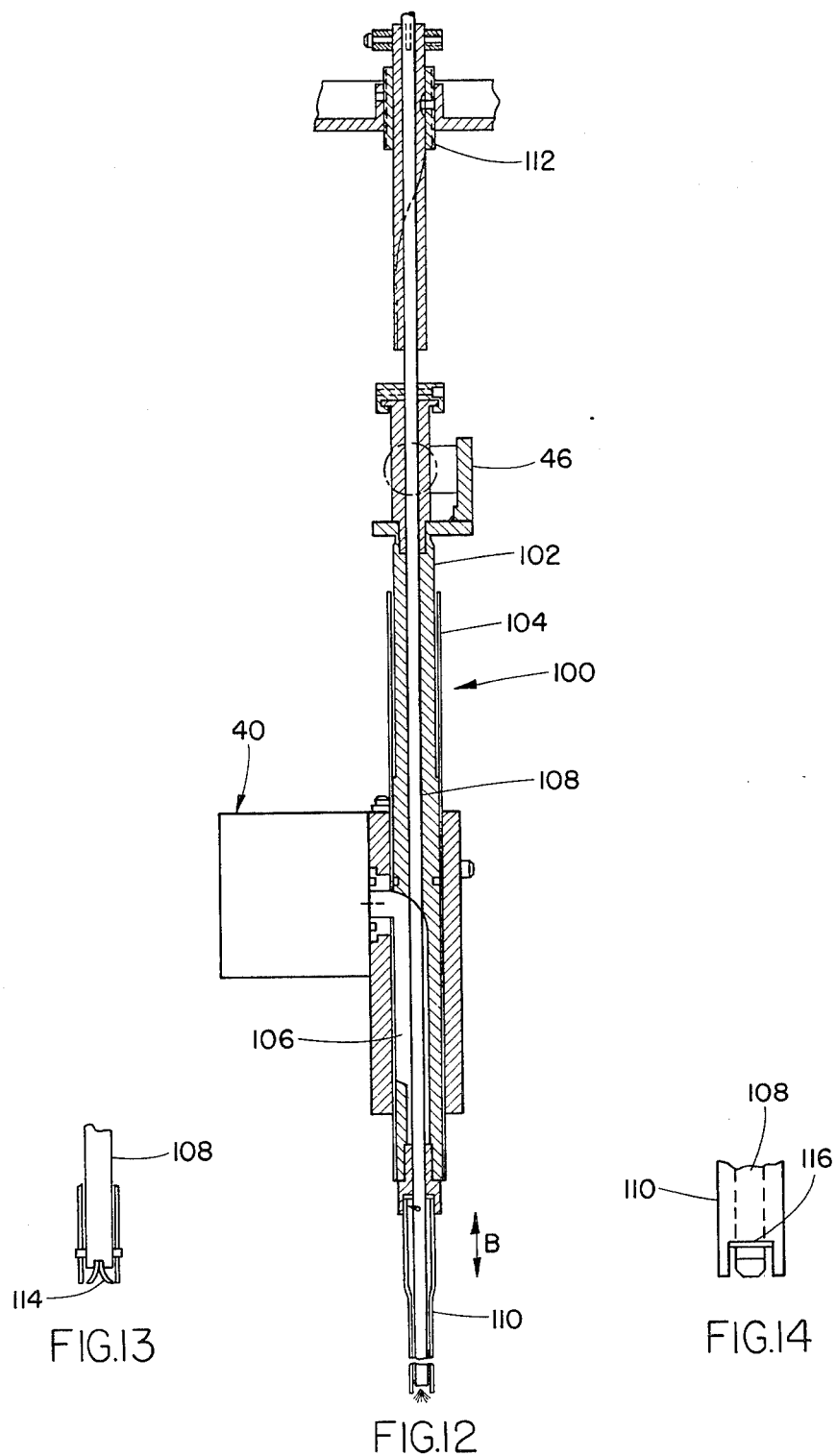
FIG. 12 illustrates a longitudinal sectional view through a modified embodiment of the filling nozzle arrangement.
FIG. 13 illustrates a fragmentary detail of the dispensing end of the filling nozzle.
FIG. 14 illustrates a further fragmentary detail of the filling nozzle dispensing end.

Referring to FIGS. 12 through 14 of the drawings, there is illustrated a modified embodiment of a dispensing nozzle unit 100 which is particularly adapted to apply a second confection material in the form of a colored syrup in a helical or swirl type pattern onto the base confection material advanced through the nozzle from the metering pump 40, in a manner as described hereinbefore.

In this construction, a nozzle stem portion 102 is slidable in the direction of arrow B within a stationary guide 104 and is adapted to be articulated by means of the actuating arm 46 as described hereinabove. Extending through the valve stem 102 and interiorly of the passageway 106 communicating with the metering pump 40 is a hollow tube 108 for the supply of a suitable secondary confection material, such as a colored syrup, which is introduceable at the upper end of the hollow tube 108.

As the lower nozzle end 110 is raised out of a mold with the concurrent discharge of the confection material from the metering pump into the mold, the hollow tube 108 may be raised by means of a suitable valve actuating mechanism (not shown) and concurrently rotated through the intermediary of a helix tube 112 fastened to a bracket on the support frame of the apparatus. The sleeve 112 may be adjustable so as to limit the stroke of the inner tube 108. Consequently, with the hollow tube 108 being raised upwardly at a different rate of speed relative to the rising nozzle 110, and concurrently being rotated in a helix, the syrupy material is deposited in the mold in a generally helical or swirl pattern providing an attractive decorative effect upon freezing of the confection.

In order to ensure that the swirling syrup will be deposited along the outer surfaces of the frozen confection, for maximum visual effect to a consumer, suitable deflector plates 114 may be provided proximate the lower end of the tube, while the tube is maintained in its central position within the nozzle through the intermediary of a transverse guide plate 116.

Although the apparatus has been described in connection with the operation of a single nozzle and metering pump, it is readily apparent to one skilled in the art that a series of nozzles may be provided in cooperation with a plurality of metering pumps to concurrently fill series of molds spaced transversely across the apparatus, such as twelve or more molds during any single operative filling sequence.

Subsequent to the filling of a row of molds with confection material in the manner described hereinabove, the conveyor of apparatus 10 is indexed forwardly to position the next row of empty molds below the filling nozzles, and the entire cycle is repeated to provide for a continuous, high-speed filling operation. By means of the apparatus described in this invention, filling rates in excess of 25 cycles per minute, preferably 30 or more, are possible.

From the foregoing it becomes readily apparent that the novel metering pump and filling nozzle arrangement allows for the uniform and constant filling of molds without the creation of voids or non-uniform filling which may be normally encountered in the conveyance and dispensing of compressible high viscosity materials.

While there has been described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. In an apparatus for the production of frozen confections of the type wherein sticks project from a block of frozen confection material, said apparatus including a frame, a plurality of carriers; a plurality of molds having open upper ends for receiving a flowable confection material being mounted on said carriers, said molds being conveyed along a predetermined path for the formation of said frozen confections; the improvement comprising means for feeding a constant metered volume of said confection material at a constant rate in a semi-frozen condition from a supply of said confection material; dispensing nozzle means having inlet means communicating with the discharge of said feeding means for receiving said confection material therefrom; means for lowering said nozzle means into said molds and thereafter raising said nozzle means from said molds while ejecting the confection material through said nozzle means into said molds in synchronism with the operation of said metering feed means so as to provide a continuous, metered flow of said confection material into said molds during each rising motion of said nozzle means thereby avoiding the formation of voids in said material during the filling of said molds, said feed means comprising a pressure-responsive, positive-displacement metering pump which advances a metered quantity of said confection material into said nozzle means during each raising cycle of said nozzle means.

2. An apparatus as claimed in claim 1, said metering comprising first and second chambers, rotatable cooperating metering valve members being arranged in each of said chambers for alternatingly connecting said chambers to said material supply, one said chamber receiving a predetermined quantity of said confection material from said supply while the confection material in the other chamber is advanced into said nozzle means for filling said molds.

3. An apparatus as claimed in claim 1, said means for lowering and raising said nozzle means into and from said molds including a pivotable lever arm connected to the upper end of said nozzle means; and means for actuating said lever arm for imparting vertical reciprocatory motion to said nozzle means in synchronism with the confection material advancing cycle of said metering feed means.

4. An apparatus as claimed in claim 3, comprising means for indexing said molds into position below the outlet of each said nozzle means during each downward displacement of said nozzle means into said molds.

5. An apparatus as claimed in claim 1, said nozzle means comprising an elongated hollow nozzle member having a bottom outlet orifice and an axial slot formed in the side wall of said nozzle member continually communicating with the discharge of said confection material metering feed means during the axial displacement of said nozzle means.

6. An apparatus as claimed in claim 5, comprising conduit means connecting into the side wall of said nozzle member for the infeed of a second confection material adapted to be admixed with said first-mentioned confection material.

7. An apparatus as claimed in claim 6, comprising an inner tube coaxially arranged within said nozzle member, said inner tube being rotatably displaceable relative to said nozzle member; means for raising said inner tube concurrent with the upward displacement of said nozzle member; and means for imparting a helical motion to said inner tube relative to said nozzle member during upward movement thereof, said second confection material being supplied through said inner tube so as to admix with the first-mentioned confection material in a generally helical decorative pattern upon filling of said molds.

8. An apparatus as claimed in claim 7, comprising deflector means arranged at the lower discharge end of said inner tube for deflecting said second confection material towards the walls of said molds.

9. An apparatus as claimed in claim 1, said confection material being a compressible material having viscous gelatinous consistency; and pump means for imparting a predetermined pressure to said material and continuously feeding said material from said supply to said metering pump so as to preclude the formation of voids during the filling of said molds with said material.

10. In a method for the production of frozen confections of the type in which sticks project from a block of frozen confection material, wherein a plurality of molds having open upper ends for receiving flowable confection material are conveyed along a predetermined path for the formation of said frozen confections; the improvement comprising feeding a constant metered volume of said confection material at a constant rate in a semi-frozen condition from a supply of said confection material; lowering said nozzle means into said molds; and conveying metered quantities of the material into dispensing nozzle means while raising said nozzle means from said molds as said confection material is dispensed from said nozzle means into said molds in synchronism with the metered feed rate of said material to thereby provide a continuous metered flow of said confection material into said molds during each rising motion of said nozzle means; whereby the formation of voids in said material during the filling of said molds is avoided, said confection material is conveyed through a positive displacement, pressure-responsive metering pump which advances a metered quantity of said confection material into said nozzle means during each rising cycle of said nozzle means.

11. A method as claimed in claim 10, said metering pump comprising first and second chambers, cooperating rotatable metering valve members in each of said chambers for alternatingly connecting said chambers to said material supply, comprising conveying a quantity of said material to one said chamber from said supply concurrent with advancing the confection material in the other chamber into said nozzle means for filling said molds.

12. A method as claimed in claim 10, comprising lowering and raising said nozzle means into and from said molds through a pivotable lever arm connected to the upper end of said nozzle means; and actuating said lever arm to impart vertical reciprocatory movement to said nozzle means in synchronism with the advance of the confection material.

13. A method as claimed in claim 12, comprising advancing said molds so as to position an empty mold below each said nozzle means during each downward stroke of said nozzle means into said molds.

14. A method as claimed in claim 10, wherein said nozzle means includes an elongated hollow nozzle member having a bottom outlet orifice and an axial slot formed in the side wall, comprising continually advancing the material through said slot into said nozzle member during the axial displacement of said nozzle means.

15. A method as claimed in claim 13, including feeding a second confection material through conduit means connecting into the side wall of said nozzle member to form a pattern with said first-mentioned confection material.

16. A method as claimed in claim 15, comprising arranging an inner tube coaxially within said nozzle member for rotatable movement relative to said nozzle member; raising said inner tube concurrent with the upward displacement of said nozzle member; and imparting a helical motion to said inner tube during upward movement thereof, said second confection material being supplied through said inner tube so as to admix with the first-mentioned confection material in a generally helical decorative pattern within said molds.

17. A method as claimed in claim 16, comprising deflecting said second confection material towards the walls of said molds.

18. A method as claimed in claim 10, said confection material being a compressible material having a viscous consistency; comprising imparting a predetermined pressure to said material and continuously supplying said material to said metering pump to preclude the formation of voids during the feed of said material from said supply.

* * * * *